June 17, 1969   P. W. SCHLOSSER   3,449,911
POWER TRANSFER SYSTEM
Filed Sept. 6, 1966
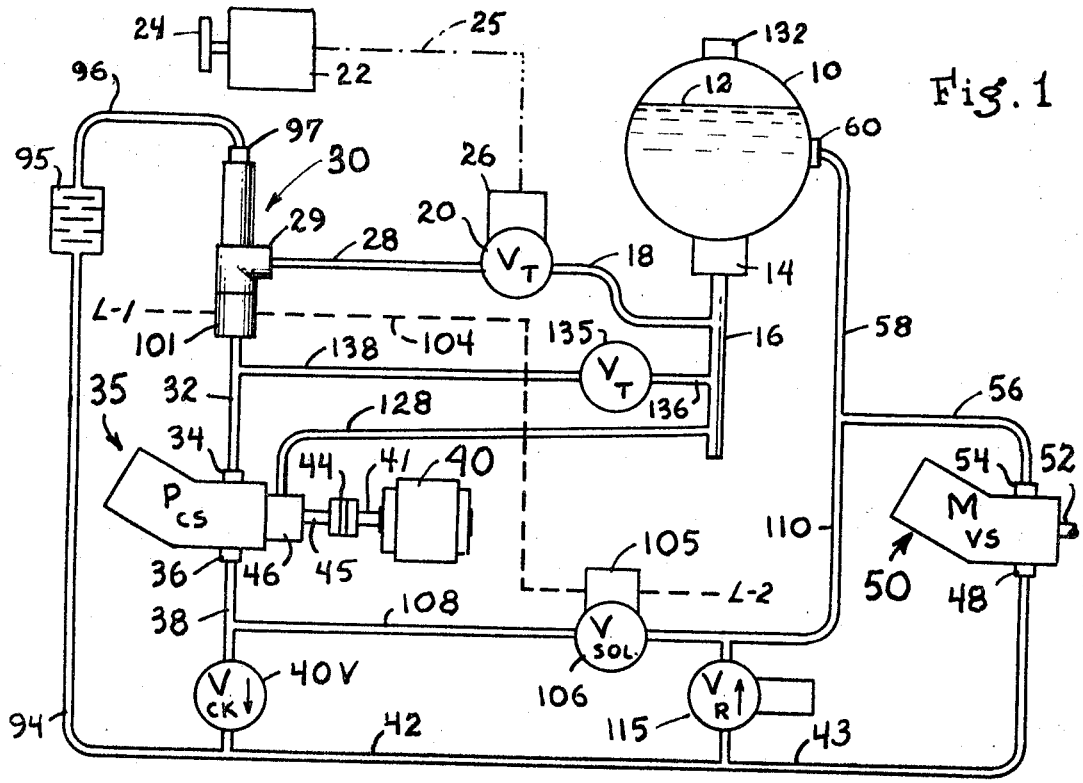
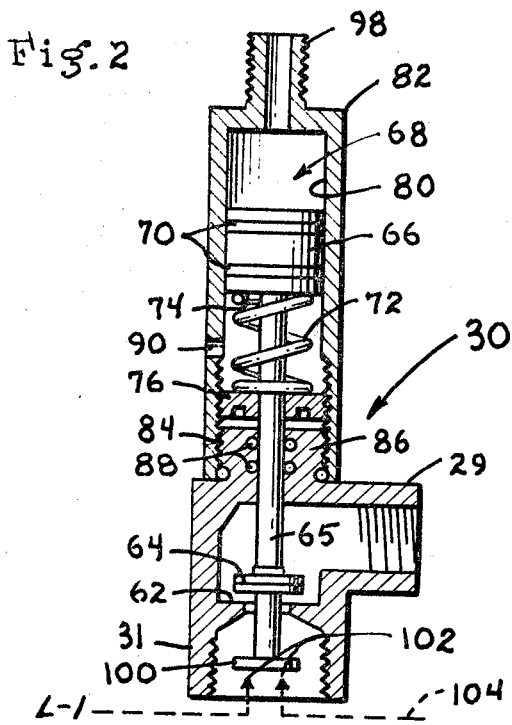
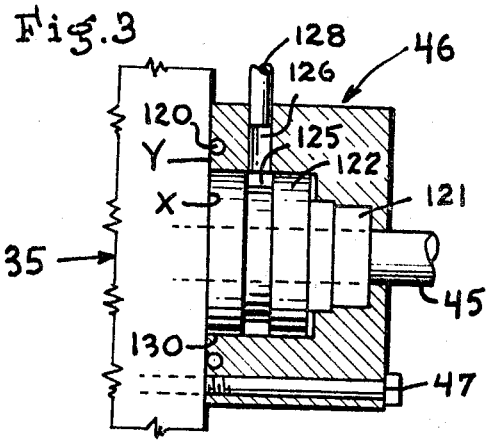
PAUL W. SCHLOSSER
INVENTOR.
By S. O. Holmes
AGENT

United States Patent Office 3,449,911
Patented June 17, 1969

---

3,449,911
POWER TRANSFER SYSTEM
Paul W. Schlosser, 4452 N. Avers, Chicago, Ill. 60625
Filed Sept. 6, 1966, Ser. No. 577,552
Int. Cl. F16d *31/02;* F15b *21/04;* F04b *21/00*
U.S. Cl. 60—53                                    12 Claims

ABSTRACT OF THE DISCLOSURE

This hydraulic system and method obtains variable torque and/or speed (horsepower) outputs from fixed volumetric capacity pumps and motors. A control system selectively meters hydraulic liquid to a pump so that a variably limited supply of liquid at or below full volumetric pump capacity is driven through the motor, thus controlling horsepower output of the motor. A small amount of liquid in the pump chamber vaporizes (cavitation) and condenses in the pump chamber to provide for cooling of the pump and liquid. Air is prevented from being ingested into the pump to prevent high pressure ignition and resultant explosions therein; which explosions are deleterious to fluid and machine parts, thus undesirable, and hereinafter referred to as dieseling. By such arrangement and method, cavitation is utilized to control power transfer between a desired minimum capacity of the apparatus and the maximum capacity thereof.

---

This invention relates to a new variable horsepower output power transfer system, and method of effecting same, wherein power driven pump means pressurizes hydraulic fluid, such as oil, and causes same to pass through suitable hydraulic circuitry to power output means, such as a motor driven by the energy impressed upon the hydraulic fluid by the pump. The invention includes control apparatus affording novel features and advantages whereby the system can be controlled from a remote station in a manner to attain variable power capacities exerted upon a driven load.

An important feature of the invention resides in the prevention of dieseling caused by ingestion of air into the pump, which air can explode in the presence of vaporized oil and high pressure, on the order of 1,000 p.s.i. and up, exerted on same during a compression stroke of the high pressure pump or the like of apparatus disclosed in this invention.

Previously known high pressure hydraulic drive systems adapted to actuate driven motors for moving loads at points remote from a point of compression of the fluid, as well as being remote from a point of control of same, have suffered from several inefficiencies and/or complications of apparatus in order to achieve same. Some such apparatus involves positionable input hydraulic motors which must be mechanically positioned whereby to achieve variable capacity of input, and hence variable capacity of output of a motor driven by the variable input pump.

Still other apparatus of related kinds have caused high pressure oil bypass to occur at low capacity demand of an output motor, at which time the input motor is operating at a given predetermined volumetric capacity and the output of the apparatus is controlled by bypassing high pressure fluid back to a sump or the like. Such apparatus is particularly wasteful of horsepower and also entails problems involving heating of the oil. In addition, dieseling of the oil in the high pressure side of the system upon compression of fluid in a motor is occasioned by the presence of air in combination with gaseous vapor which is compressed with the air to a pressure raising the fluid or oil temperature to a degree exceeding the flash point of same, thus causing an explosion. Such explosion causes severe deterioration of the oil in the system and carbon deposits and the like which contribute to short life for parts operating in the environment thus created.

Accordingly, it is a broad object of the invention to provide improved means and/or method for operating a variable horsepower capacity fluid driven system.

Another object, in keeping with the above object, is to provide improved means and/or method for controlling the output capacity of a driven system of the high pressure oil driven type.

A further object, in keeping with each of and preceding objects, is to provide improved means and/or method for operating an hydraulic drive system at variable capacity while utilizing fixed volumetric capacity input pumps and fixed volumetric capacity output motors.

A still further important object of the invention is to provide means and/or method for preventing dieseling of hydraulic drive fluid in the presence of ingested air.

Other objects and advantages of the invention reside in arrangements of parts and details of construction and steps utilized in effecting the method hereof, and those skilled in the art will be apprised of the advantages and features of the invention upon consideration of the following specification and claims read in view of the accompanying drawings in which:

FIG. 1 is a diagrammatic view of an hydraulic drive system incorporating the features of the present invention;

FIG. 2 is a detailed cross-sectional view of a control valve comprising part of the invention; and FIG. 3 is a detailed half-sectional view of a bushing including an improved seal for the power input shaft to the pump of the invention, which seal inhibits ingestion of air into the pump.

Referring for further detail to the drawings, and first to FIG. 1, a reservoir 10, which also functions as a return sump, is a conventional tank supplying a suitable level 12 of hydraulic oil therein. The oil passes out the bottom of the tank 10 through a conventional filter 14 and into an oil header 16. Oil passes from the header 16 through a pipe 18 and, as shown, may pass through a throttle valve 20 controlled by a remote control device 22 that may be located, for example, near the power output end of the apparatus to be described hereinbelow, whereby careful control of the output of the system can be achieved even though the power input of the system may be quite remote from the power output thereof. The control 22 may have a manual, or automatic, movable control arm 24 which, through suitable hydraulic or electric circuitry 25, controls the position of a motor 26 that in turn positions the throttle valve 20.

The throttle valve 20, when used in the system, controls the supply of hydraulic fluid to a line 28 leading to an automatic control valve generally indicated at 30. From the automatic control valve 30, the oil passes through a pipe 32 to an input side 34 of a pump 35 wherein the oil is pressurized.

The impeller means of the system, such as a pump 35 may be one of several kinds and, as diagrammatically indicated for purposes of illustration only, may be of the kind that has an angular body housing a rotatable wobble plate or swash plate therein, not shown, which plate drives a series of pistons causing the oil to be highly pressurized in cylinders in the motor 35 and driven out of an output port 36 into a hydraulic line 38. Pressures from 2,000 to 3,000 p.s.i. are used in this apparatus, and pressures above and below such range can be utilized. It is to be understood that pumps other than piston-type pumps can be used in this invention, i.e., gear, diaphragm, etc.

An electric motor 40 is shown as turning a drive shaft 41, which through a flexible coupling 44, turns a drive shaft 45 for the pump 35. The drive shaft 45 passes through an airlock seal 46, to be described more in detail hereinbelow, and drives the pump apparatus within the interior of the pump 35 for pressurizing oil and feeding same into the pipe 38.

Pressurized oil from the pipe 38 passes through a check valve 40V and into a line 42 which leads through a pipe 43 to an input side 48 of a driven motor 50. The motor 50 is indicated as being substantially identical to the pump 35 and can include a swash plate identical to that of the pump 35. Several manufacturers produce such apparatus which can operate either as pump or motor, and accordingly further detail is deemed unnecessary.

In the motor 50 the pressurized oil exerts energy upon a series of rotating pistons acting on a swash plate (both well known in the art and not shown) to turn an output shaft 52 that is connected to a load, not shown, of any suitable kind, but which, in the example to be described hereinbelow, is a load that may function at both desired torque capacities and at variable speeds, both of which functions can be accomplished from the remote control apparatus 22 by manipulation of the control arm 24 for the control apparatus 22 positioning the throttle valve 20. Spent oil from the motor 50 passes out an outlet 54 from the motor 50 through the pipes 56 and 58 back to a suitable sump connection 60 on the tank 10.

As mentioned briefly above, the pump and motor apparatus of the present invention is adapted to operate through a predetermined range of speeds and horsepower outputs of the motor driven shaft 52. Accordingly, to prevent injury of parts due to excessively high fluid pressure when operating under extreme load conditions, the present invention provides automatic control apparatus affording safety features not present in known equipment of generally similar kind, which safety apparatus will now be described.

Referring to FIG. 2 the body of the automatic fluid control valve 30 is shown as comprising the inlet 29 and the outlet 31. It is to be understood that, because the fluid pressure is low, the inlets and outlet can be reversed within the teachings of this invention. A valve seat 62 is provided in the body of the valve 30, and same is adapted to be opened and closed by a valve 64, positioned by a valve stem 65 under the influence of a stroke piston 66 that is moved up and down responsive to presence of high pressure oil in a chamber 68 above the piston 66. The piston 66 is provided with suitable seals 70 whereby to resist high pressure. The piston 66 is further biased upwardly by a spring 72 which bears on the lower surface 74 of the piston at its upper end, and on an adjustable plug 76 internal of the cylinder 80 within which the piston 66 is constrained to move. The spring 72 is preferably of a constant tension type even in the presence of ambient temperature changes, and is preferably preadjusted by a factory setting to achieve proper attributes of the invention and prevent tampering of unskilled personnel who may come in contact with the equipment in the several fields of use to which same may be put.

The piston 66 and cylinder assembly is contained in a housing 82 which is secured by threads 84 to a boss 86 on top of the valve body 30. The space below the piston 66 may be suitably vented to atmosphere by a hole 90 whereby any leakage of high pressure oil from the chamber 68 around the seals 70 will not inhibit proper operation of the piston 66. The piston 66 is actuated by high pressure hydraulic fluid existing in the lower, as shown, pipe 42 which connects with a pipe 94 which may pass through a hydraulic surge damper 95, which damper may or may not be used in different applications of the apparatus, through a pipe 96 that connects with a pipe connector (not shown) to a male threaded boss 98 in fluid communication with the chamber 68 above the piston 66. It is obvious that high pressure fluid in the chamber 68 will exert force against the bias of the spring 72 driving the valve stem 65 downward thus moving the valve 64 more closely toward the valve seat 62. Such downward movement will result in throttling of the hydraulic fluid passing into the valve through the connection 29 and out of the valve through the connection 31.

In the automatic operation of this apparatus, an increased pressure builds up in the chamber 68, the piston 66 will be driven further and further downward against the bias of the spring 72, and accordingly move the valve 64 closer and closer toward seat 62 thus throttling the flow of hydraulic fluid therethrough. The throttling of fluid will reduce the flow of fluid through the pipe 32, FIG. 1, and thus reduce the supply of input oil through the input connection 34 of the pump 35 which in turn, therefore, will deliver a lower quantity of high pressure oil feeding the line 42, in turn supplying oil to line 44 to the input 48 of the motor 50, and hence reduce the speed of rotation of the shaft 52. It is to be noted that this function will occur automatically regardless of the position of the throttle valve 20 as a result of positioning of the control arm 24 controlling the remote control system 25 described hereinabove.

If the power demand on the output shaft 52 of the motor 50 is reduced at the time the speed of the shaft 52 is decreased concurrently with the throttling function described immediately above, the pressure in the line 44 will decrease. Such decrease in pressure will travel through the line 94, surge damper 95, line 96 and into the chamber 68 in the valve 30. Hence, the spring 72 will drive the piston upward and the valve 64 will move away from the seat 62 and allow a larger quantity of oil to flow to the pump 35, thence to the motor 50 to increase the speed of the shaft 52. It is found that the valve 30 operates quickly, and the adjustment to load changes is effected nearly instantaneously, even though the system is operating almost at its ultimate practicable high pressure achieving the highest torque output at the shaft 52.

During such high torque capacity operation, because the pump 35 has a fixed, or constant, volumetric capacity, and the supply oil is throttled, the following phenomenon obtains. On the input side of the pump 35 only a limited amount of liquid will throttle past the valve and seat 64–62, FIG. 2. As a result, cylinder chambers will not fill with liquid and a vacuum condition will be established in the cylinder chambers. Hence, a quantity of oil vapor will be evaporated from the oil to fill the pump intake chambers at least partially; oil also being present. Because the oil gives up latent heat during such evaporation, both the liquid oil and oil vapor will become chilled. Such function, accordingly, serves the useful purpose of cooling structural parts of the pump 35, as well as the oil. This phenomenon is described more in detail in my Patent No. 3,254,845.

During the compression function of the pump 35, the oil vapor will condense and be driven with other liquid oil into the line 38. However, the body of driven oil, per se, will not attain as high a temperature at a given reference pressure, such as input pressure of oil in line 28, because the thermal gradient through the changes of state from liquid-to-vapor-to-liquid is a negative gradient. Accordingly, the need for oil-cooling heat exchangers, or the like, in the high pressure oil line 38 is obviated. This function is achieved in piston type pumps, gear pumps, vane pumps, diaphragm pumps, and the like.

When the valve stem 65 is moved down sufficiently to cause engagement of the seat 62 by the valve 64, either electrical or mechanical means can be used to provide a desired control function. As shown, an electric contact plate 100 carried within a switch adapter 101, FIG. 1 is adapted to bridge electric contacts 102 simultaneously with valve closure to establish a circuit from an electric source L1, FIG. 1 through an electrical conductor 104 to a solenoid 105 in turn connected back to the electric source L2 as indicated. The solenoid, at this time, will cause a valve 106 to open thus opening a passageway from line 38 through a pipe 108 to a pipe 110 connected to the line 58 back to the tank 10. Accordingly, it is seen that this structure will prevent both flow of fluid to the pump 34 and the passage of exceedingly highly pressurized fluid to the motor 50 and associated parts of the apparatus. Also at this time, the piston will cycle up and down quickly to cause quick cycling of the valve 64, the contacts 102, and the solenoid valve 106 to achieve a precise control function.

It is preferred that the voltage across the contacts 102 be quite low, in the presence of hydrocarbon liquids, to prevent arcing. Suitable transformer means, not shown, may be included in the circuitry to achieve this low voltage, and to accommodate the solenoid 105.

An additional safety feature is provided in this invention by means of a relief valve 115 that may operate against a suitable spring bias to relieve pressure between lines 42 and 43 and vent same to the line 110 in the event failure occurs in the automatic valve 30 or the electrical circuit, etc., for any reason. The system can be operated with safety adjacent the ultimate capacity thereof.

When the supply of oil is shut off to the pipe 32 feeding the pump 35, the pump will continue to be driven by the motor 40 in the system of this invention. Of course it is to be understood that intermittently operating apparatus could be supplied, but, in the apparatus herein taught the motor is preferably continuously operating. However, this system does not consume appreciable horsepower at the time the high pressure side of the pump 35 is vented to the sump 10 through either the solenoid valve 106 or the pressure relief valve 115 to the tank 10 for reasons to be pointed out next.

At stand-by times of no power output of the motor 50, and with the pump 50 running, and being of a piston type, the hydraulic fluid within the pump will evaporate on the suction stroke and condense on the compression stroke of each piston in each cylinder in the pump 35. The horsepower consumption at this time is very low; whereas the system is readied for an almost instantaneous output of power on demand. This low horsepower consumption is attributed to the phenomenon mentioned briefly above wherein the system was explained as operating at high-torque and slow-speed capacity, and is more fully described in the above mentioned patent.

The present system operates in a desirable new manner when the solenoid valves 105–106 is omitted, or disabled, and the throttle valve 135 is shut. At such time, with the liquid supply to the motor 50 stopped as by high load, for example, the pressure in pipes 38, 42, 43, 94 and 96 will rise to cause the valve 64 to engage its seat 62 and completely shut off the supply of liquid to the pump 35. As long as the condition obtains stopping the liquid supply to the motor 50, the pump 35 will require minimum power and, depending upon the type of pump 35 used, different degrees of evaporation and condensing of liquid in the pump 35 will occur. It is found that the pump 35 does not heat excessively, and the total heat of liquid in the system will be reduced if the heat of same is above ambient temperature.

When the condition causing stoppage of liquid flow to the motor 50 is removed or reduced, the motor will start instantly. Liquid in the chamber 68 of the valve 30 will be driven by tension of the spring 72 to supply the motor 50 during the instant that may be required to permit condensation of vapor that may exist in the suction side of the pump 35. To assure such function, the volume of the chamber 68 can be proportioned properly to accumulate sufficient liquid to achieve same in keeping with the above disclosure. Hence, the proportions of parts may differ substantially from the diagrammatic representation thereof to accommodate stand-by times of the system.

At such stand-by times, and during low capacity output, whether the pump 35 be of the piston type, or other type, it is important that no air be ingested around drive shaft 45 into the interior of the pump, which air will mix with the vaporized oil, and, upon being compressed, can attain such high temperatures that same will flash to cause explosions, herein termed dieseling, which can damage parts severely, and which inevitably create carbon and other deposits that are deleterious to the apparatus hereof.

FIG. 3 shows details of a bearing housing 46 for attachment to the drive shaft end of the pump 35. The housing 46 is held in place by machine screws 47, only one being shown, and a seal 120 prevents leakage between flat surfaces X and Y of the motor 35 and housing 46 respectively. Conventional seals and retaining means 121 are provided around the shaft 45 in known manner. The improvement for preventing dieseling comprises a rotatable air seal member 122 having suitable means such as a central groove 125 in registry with an orifice 126 in the top surface of the housing 46 which is supplied at all times with oil through a pipe 128 in direct communication with the header 16, and preferably, but not necessarily, arranged with relationship to the tank 10 so that oil is always gravitationally supplied through the pipe 128, and air, if ingested around the seals 120 will gravitate upwardly through the pipe 128 to the tank 10 which is vented to atmosphere through a conventional vent-cap 132.

With such structure, hydraulic oil is always present around the groove 125 and any seepage around an edge 130 of the rotatable air seal member 122 will entrain oil rather than air. It is to be noted, that the quantity of oil ingested can be only a slight trickle permitted around conventional machine clearances of the edge 130.

A secondary operating throttle valve 135 is provided for causing communication from the header 16 through a pipe 136 to a pipe 138 to the supply pipe 32 for the pump 35. The throttle valve 135 can be manipulated either simultaneously with or alternate to the automatic control apparatus comprising the remote control mechanism 22, 25, 26 controlling the throttle valve 20, and can conveniently provide a minimum capacity setting for operating the output motor. Thus the system can be set to perform certain desirable functions wherein a normal minimum capacity is desired that differs from a normal minimum capacity that may be provided by the automatic control apparatus described hereinabove. With the secondary throttle valve 135 in use, the automatic safety control apparatus of the valve 30 will operate to open and close the solenoid valve 106 in the event the pressure in the system exceeds a predetermined high value only down to the capacity of the throttle valve 135. Hence, the secondary control is suitably adapted preferably for minimum speed adjustment under less than maximum torque demand conditions.

In accordance with the above disclosure, it is obvious that the purpose of the invention of providing a closely controllable remotely controlled, or proximately controlled variable capacity and speed hydraulic drive system, has been achieved by apparatus controlling the input of oil to a fixed capacity pump 35. The specific pump used may be different from the swash plate pump described, and may be of a diaphragm type, a positive displacement piston pump, or gear or the vane pump, or of other known kinds, within keeping of the teachings of the invention.

While a presently preferred embodiment of the invention has been disclosed by way of example, obviously other modifications of the invention will occur to those skilled in the art in view of the instant disclosure. Accordingly, it is desired not to be limited in the invention only to the specific structure diagrammatically shown and described but only by the spirit and scope of the following claims.

I claim:

1. Apparatus for controlling a liquid drive system including means providing a source of liquid, power operated pump means for pressurizing said liquid, motor means driven by said pressurized liquid, and liquid conduit means interconnecting said source means and said pump means and said motor means, characterized by and comprising means for controlling the amount of liquid supplied to said pump means from said source means to control the capacity of the liquid drive system between predetermined maximum and minimum capacities thereof, said controlling means including means for supplying liquid to said pump means at and below the volumetric capacity of said pump means.

2. Apparatus generally as set forth in claim 1, including means for preventing dieseling in said pump comprising a liquid wetted seal at the point of input of power to said pump for admitting liquid and preventing ingestion of air into said pump.

3. Apparatus generally as set forth in claim 1, including power limiting means for said system, comprising a pressurized liquid operated shut-off valve further controlling the supply of liquid to said pump in response to the pressure of liquid delivered from same, and means controlled by said shut-off valve for reducing the pressure of liquid delivered by said pump.

4. Apparatus generally as set forth in claim 3, further including a pressure relief valve for by-passing said shut-off valve controlled means.

5. Apparatus generally as set forth in claim 1, said pump means being a cyclically operated positive displacement type having a fixed volumetric capacity per cycle.

6. Apparatus generally as set forth in claim 1, said motor means being a cyclically operated positive displacement type having a fixed volumetric capacity per cycle.

7. Apparatus generally as set forth in claim 1, said pump means and said motor means both being cyclically operated positive displacement type having a fixed volumetric capacity per cycle.

8. Apparatus generally as set forth in claim 1, including control means for said amount of liquid controlling seal being wetted under gravitational pressure from said means.

9. Apparatus generally as set forth in claim 2, said seal being wetted under gravitational pressure from said source of liquid.

10. Apparatus generally as set forth in claim 9, said seal being constructed and arranged so that air entering said seal is gravitationally vented to said source of liquid.

11. In a liquid drive system including a pump having a liquid input side operable at a predetermined subatmospheric pressure, and a shaft for driving said pump, the combination of means for preventing ingestion of air into said input side of said pump around said shaft comprising a housing around said shaft, a source of supply of said liquid to said housing, and means forming a passageway for air from said shaft.

12. A liquid drive system for variable-capacity-horsepower service comprising power operated means for driving liquid, variable horsepower output capacity means driven by said driving means via said liquid, and means controlling the quantity of input of liquid to said power operated means for controlling the horsepower output capacity of said driven means, said drive system including a pump having a liquid input side operable at a predetermined pressure, and a shaft for driving said pump, the combination of means for preventing ingestion of air into said input side of said pump around said shaft comprising a housing around said shaft, a source of supply of said liquid to said housing, and means forming a passageway for air from said shaft.

References Cited
UNITED STATES PATENTS 2,251,664   8/1941   Davis.
2,918,085   12/1959   Govan et al.
3,043,107   7/1962   Magnus _____ 60—52

EDGAR W. GEOGHEGAN, *Primary Examiner.*

U.S. Cl. X.R.
92—79; 103—203

REEXAMINATION CERTIFICATE (580th)

United States Patent [19]

Schlosser

[11] B1 3,449,911

[45] Certificate Issued Oct. 14, 1986

[54] POWER TRANSFER SYSTEM

[75] Inventor: Paul W. Schlosser, Chicago, Ill.

[73] Assignee: Muncie Power Products, Inc., Muncie, Ind.

Reexamination Request:
No. 90/000,806, Jun. 19, 1985

Reexamination Certificate for:
Patent No.: 3,449,911
Issued: Jun. 17, 1969
Appl. No.: 577,552
Filed: Sep. 6, 1966

[51] Int. Cl.$^4$ .............. F16D 31/02; F15B 21/04; F04B 21/00
[52] U.S. Cl. .................. 60/453; 60/468; 60/494; 92/79; 417/295
[58] Field of Search ........... 418/102, 95; 417/295; 60/468, 459, 494

[56] References Cited

U.S. PATENT DOCUMENTS

| | | | |
|---|---|---|---|
| 1,307,602 | 6/1919 | Schirmer | 417/315 |
| 1,913,657 | 6/1933 | Buchanan et al. | 418/97 |
| 2,271,415 | 1/1942 | Conlon | 417/233 |
| 2,464,283 | 3/1949 | Adams | 60/468 X |
| 3,631,937 | 1/1972 | Joyce | 60/405 X |
| 3,744,374 | 7/1973 | Schneider et al. | 91/461 X |

FOREIGN PATENT DOCUMENTS 2363480 6/1975 Fed. Rep. of Germany ...... 417/221

*Primary Examiner*—Edward Look

[57] ABSTRACT

This hydraulic system and method obtains variable torque and/or speed (horsepower) outputs from fixed volumetric capacity pumps and motors. A control system selectively meters hydraulic liquid to a pump so that a variably limited supply of liquid at or below full volumetric pump capacity is driven through the motor, thus controlling horsepower output of the motor. A small amount of liquid in the pump chamber vaporizes (cavitation) and condenses in the pump chamber to provide for cooling of the pump liquid. Air is prevented from being ingested into the pump to prevent high pressure ignition and resultant explosions therein; which explosions are deleterious to fluid and machine parts, thus undesirable, and hereinafter referred to as dieseling. By such arrangement and method, cavitation is utilized to control power transfer between a desired minimum capacity of the apparatus and the maximum capacity thereof.

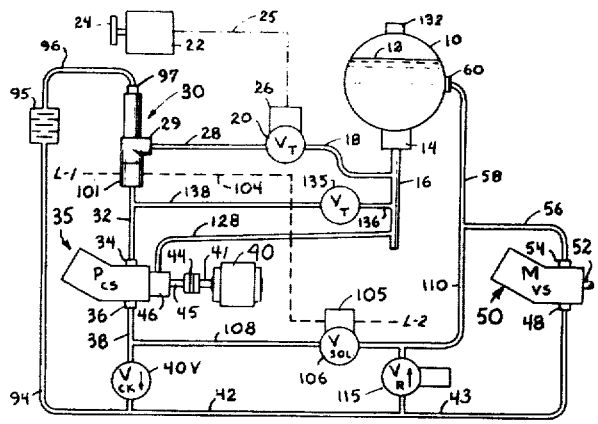

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3 and 4 is confirmed.

Claims 1, 2, and 5–12 are cancelled.

* * * * *